United States Patent [19]

Walker et al.

[11] Patent Number: 5,130,405
[45] Date of Patent: Jul. 14, 1992

[54] ACID ETCH RESISTANT COATINGS

[75] Inventors: Frederick H. Walker; John L. Gardon, both of Birmingham, Mich.

[73] Assignee: Akzo N.V., Arnhem, Netherlands

[21] Appl. No.: 640,655

[22] Filed: Jan. 14, 1991

Related U.S. Application Data

[63] Continuation-in-part of Ser. No. 517,086, May 1, 1990, which is a continuation-in-part of Ser. No. 379,300, Jul. 13, 1989, abandoned.

[51] Int. Cl.$^5$ .............................................. C08G 18/32
[52] U.S. Cl. ...................................... 528/78; 525/456; 528/76; 528/85; 528/264
[58] Field of Search ............... 528/73, 75, 80, 76, 528/85, 78; 525/456

[56] References Cited

U.S. PATENT DOCUMENTS

| | | | |
|---|---|---|---|
| 3,248,373 | 4/1966 | Barringer | 260/77.5 |
| 3,626,023 | 12/1971 | Brizgys | 260/849 |
| 3,785,861 | 1/1974 | Tanimura et al. | 117/138.8 B |
| 4,017,556 | 4/1977 | Wang | 260/856 |
| 4,021,505 | 5/1977 | Wang | 260/856 |
| 4,046,729 | 9/1977 | Seriven et al. | 260/29.2 TN |
| 4,066,591 | 1/1978 | Seriven et al. | 260/29.2 TN |
| 4,143,091 | 3/1979 | Chang et al. | 260/859 R |
| 4,163,094 | 7/1979 | Turpin | 523/45 |
| 4,248,750 | 8/1981 | Amirsakis | 528/79 |
| 4,268,684 | 5/1981 | Gurgiolo | 560/24 |
| 4,288,577 | 9/1981 | McShane | 525/453 |
| 4,289,813 | 9/1981 | Blomeyer et al. | 427/385.5 |
| 4,410,667 | 10/1983 | Porter, Jr. et al. | 525/440 |
| 4,451,622 | 5/1984 | DiDomenico, Jr. | 528/85 |
| 4,484,994 | 11/1984 | Jacobs, III et al. | 204/181 |
| 4,485,228 | 11/1984 | Chang et al. | 528/84 |
| 4,520,167 | 5/1985 | Blank et al. | 525/131 |
| 4,524,192 | 6/1985 | Alexander et al. | 525/440 |
| 4,530,976 | 7/1985 | Kordomenos et al. | 525/440 |
| 4,533,703 | 8/1985 | Kordomenos et al. | 525/440 |
| 4,533,704 | 8/1985 | Alexander et al. | 525/440 |
| 4,540,766 | 9/1985 | Chang et al. | 528/45 |
| 4,540,771 | 9/1985 | Ambrose et al. | 528/272 |
| 4,543,405 | 9/1985 | Ambrose et al. | 528/73 |
| 4,548,998 | 10/1985 | Chang et al. | 525/441 |
| 4,554,188 | 11/1985 | Holubka et al. | 427/393.5 |
| 4,559,383 | 12/1985 | Holubka et al. | 524/542 |
| 4,587,323 | 5/1986 | Toman | 528/66 |
| 4,605,724 | 8/1986 | Ambrose et al. | 528/73 |
| 4,631,320 | 12/1986 | Parekh et al. | 525/452 |
| 4,711,929 | 12/1987 | Stamegna et al. | 525/131 |
| 4,789,718 | 12/1988 | Noll et al. | 528/49 |

FOREIGN PATENT DOCUMENTS

| | | |
|---|---|---|
| 0139513 | 10/1984 | European Pat. Off. |
| 0220000 | 10/1985 | European Pat. Off. |
| 0257848 | 8/1987 | European Pat. Off. |
| 0373671 | 12/1989 | European Pat. Off. |
| 2611782 | 3/1975 | Fed. Rep. of Germany |
| JA067538 | 6/1975 | Japan |
| 67538 | 6/1975 | Japan |
| 144432 | 12/1976 | Japan |
| 9006209 | 7/1982 | Japan |
| 3089574 | 10/1986 | Japan |

OTHER PUBLICATIONS

Sebenik, A. et al., "Study of the Reaction between Ethylene Glycol or 1,2-Propylene Glycol with Dipheneyometyahe-4,4'-diisocyanate", 1983, pp. 341-353.

Primary Examiner—John Kight, III
Assistant Examiner—Shelley Wright
Attorney, Agent, or Firm—James K. Poole; Louis A. Morris; Bart E. Lerman

[57] ABSTRACT

A high solids coating composition suitable for use, for example, as a high performance automotive coating is provided, which comprises (1) a particular polyurethane polyol which is the reaction product of an symmetric 1,3-diol component and an isocyanate component, and (2) an hydroxyl group-reactive crosslinking agent. When formulated as a one-pack coating preferably with an aminoplast crosslinking agent, these coating compositions possess a number of desirable properties including excellent acid etch resistance.

29 Claims, No Drawings

ACID ETCH RESISTANT COATINGS

This application is a continuation-in-part of co-pending application Ser. No. 517,086, filed May 1, 1990, which is a continuation-in-part of application Ser. No. 379,300, filed Jul. 13, 1989, now abandoned.

This application is related to commonly assigned and copending application Ser. No. 517,091, filed May 1, 1990.

BACKGROUND OF THE INVENTION

The present invention relates generally to high solids coating compositions suitable for use, for example, as high performance automotive coatings.

Many of the high performance, high solids automotive coatings presently in use are based upon polymeric systems comprised of either polyester-based or polyacrylic-based polyols and crosslinking agents therefor. These coatings are generally supplied as "one-pack" or "two-pack" systems.

In a typical one-pack system, all of the coating ingredients are combined into one storage stable mixture. Upon application the polyol component is crosslinked, generally with an aminoplast resin (such as a melamine resin) or a blocked isocyanate, under heat cure conditions of 120° C. or above. In a typical two-pack system, the polyol component is combined with a crosslinking agent, generally an isocyanate, shortly before application, with curing being conducted at ambient or elevated temperatures.

For environmental reasons, it is becoming increasingly important to develop polymeric systems with low solution viscosities, which permit the formulation of high solids coatings with low application viscosities suitable for spraying. High solids coatings (generally about 50 wt % or greater solids) significantly decrease the amount of volatile organic compounds (VOC) entering the atmosphere upon drying/curing of the coating.

To achieve acceptable solution viscosities (20–30 seconds, #4 Ford Cup at 20° C.) for typical high solids coating systems, the polyols should possess a weight average molecular weight (Mw) of about 5000 or lower. In general, the lower the Mw the lower the solution viscosity.

To achieve good film properties it is important that, upon film formation, the polyol molecules become sufficiently chemically bonded to each other. This can be accomplished by providing each polyol molecule with at least two reactive hydroxyl groups. A too low hydroxyl equivalent weight (HEW) (e.g., below about 200), however, may lead to brittle films. It has been found that, in general, the best spectrum of film properties may be obtained for HEWs between about 300 to 500. It follows, therefore, that for good film formation the polyols should possess a number average molecular weight (Mn) of at least about 800.

As is evident from the above discussion, the requirements for acceptable solution viscosities and good film properties lead to contradictory molecular weight requirements—for low solution viscosities the Mw should be low, but for good film properties the Mn should be high.

In acrylic free radical polymerization and in polycondensation leading to polyesters, it is difficult to achieve desirable molecular weights with sufficiently narrow molecular weight distributions. In other words, it is difficult to formulate high solids, high performance coating systems from acrylic and/or polyester based polyols which possess both acceptable application viscosities and resulting film properties.

A considerable amount of work in this area has recently been done relating to high solids, high performance coatings which are based, in part, upon relatively low molecular weight polyesterurethane, urethane-modified polyester and polyurethane polyols.

For example, U.S. Pat. Nos. 4,485,228, 4,540,766, 4,540,771 and U.S. Pat. No. 4,605,724 describe high solids coating systems based, in part, upon relatively low molecular weight polyesterurethane polyols and crosslinking agents therefor. More particularly, U.S. Pat. No. 4,485,228 describes a two-pack system with a polyisocyanate crosslinker, while U.S. Pat. No. 4,540,766 describes a one-pack system with an aminoplast or blocked isocyanate crosslinker. The polyesterurethane polyols of these references are produced via the reaction of a polyisocyanate with a stoichiometric excess of a polyester polyol.

In related U.S. Pat. No. 4,543,405 are disclosed high solids coatings based upon low molecular weight polyurethane polyols and/or higher molecular weight prepolymers (e.g., urethane-modified polyesters), which polyurethane polyols are produced by reacting a polyisocyanate with a large excess of a polyol. After completion of the reaction, the excess polyol is removed, e.g., by distillation. Also relevant in this aspect is U.S. Pat. No. 4,288,577.

U.S. Pat. No. 4,548,998, like those references just mentioned, describes a high solids coating system based upon a polyesterurethane polyol, except that the polyesterurethane polyol is produced by isocyanate-free reaction of a polyester polyol, urea and a polyamine.

U.S. Pat. Nos. 4,524,192, 4,530,976, 4,533,703, 4,533,704 and EP-A-0139513 describe similar high solids coating systems which are based, in part, upon urethane-modified polyester polyols and crosslinking agents therefor. The urethane-modified polyester polyols are produced by reacting a urethane-modified diol component (from a diol and diisocyanate) with a diacid component and a second polyol including at least 5 wt % triol.

Finally, U.S. Pat. Nos. 4,544,188 and 4,559,383 both disclose high solids, organic solvent based coating compositions based upon a particular urethane modified polyhydroxy oligomer and an hydroxyl group reactive crosslinking agent. The urethane modified polyhydroxy oligomer contains at least two hydroxyl groups and a single blocked isocyanate group, and is produced by reacting a polyol comprising three or more hydroxyl groups and a half-blocked diisocyanate.

As mentioned above, due to environmental concerns it is becoming increasingly important to reduce the VOC of coatings in general. Additionally, due to the current deterioration of the environment and, particularly, the proliferation of acid rain, it is also becoming increasingly important that such coatings, upon curing drying, display improved acid etch resistance.

To obtain high solids content while maintaining acceptable viscosity for spray application, the industry has tended to decrease the Mn of the acrylic and polyester based polyols and increase the amount of crosslinker. Many of the state-of-the-art high solids systems, especially the one-pack systems, utilize aminoplast resins (such as hexamethoxymelamine resins) as the crosslinker. Generally, however, as the amount of aminoplast resin is increased, the acid etch resistance of these coatings is compromised. It is believed that the ester bonds in acrylic/melamine or polyester/melamine coatings are weak points in the crosslinked network, and susceptible to acid catalyzed hydrolysis.

Others of the aforementioned systems, formulated as two-pack systems with isocyanate crosslinkers, provide better acid etch resistance; however, the use of isocyanates has a number of disadvantages. For example, these two-pack systems require special handling and storage operations to avoid human exposure to the toxic isocyanates. Further, the components can only be mixed shortly prior to use, often resulting in mixing errors which can adversely affect the quality of the resulting coating.

It would, therefore, also be advantageous to provide a one-pack, high solids system which displays a good balance of physical and chemical properties and, especially, good acid etch resistance.

SUMMARY OF THE INVENTION

In accordance with the present invention, there is provided a particularly advantageous coating composition comprising:

(1) a polyurethane polyol possessing a number average molecular weight (Mn) in the range of from about 600 to about 3000 and a degree of dispersion in the range of from about 1.1 to about 3.5, comprising the reaction product of
 (A) a diol component selected from substantially monomeric, symmetric 1,3-diols comprising at least 4 carbon atoms, and
 (B) an isocyanate component selected from n-functional polyisocyanates, wherein n is a number in the range of from 2 to 5; and
(2) an hydroxyl group-reactive crosslinking agent.

It should be noted that, as used herein, the term "polyurethane polyol" refers to a reaction product wherein the reactants (diol component and polyisocyanate component) are linked substantially only via urethane linkage. This is in contrast, for example, to the aforementioned polyesterurethane and urethane-modified polyester polyols, in which the reactants are linked via urethane as well as ester linkages.

These coating compositions in accordance with the present invention are particularly suitable as high solids clear and pigmented coatings having non-volatiles contents generally ranging from about 40 wt % to about 80 wt %. Even at these high non-volatiles contents, the coatings possess relatively low viscosities generally ranging from about 25 mPa.s to about 300 mPa.s (at 25° C.).

Further, upon application and curing of the coating compositions, the resulting films possess a number of desirable properties such as good UV durability, chemical and weathering resistance and other properties making them particularly suitable for use, for example, in automotive, general industrial, plastics and decorative coatings applications.

These coating compositions find particular use in high solids, high performance one-pack automotive coatings formulated with aminoplast and blocked isocyanate crosslinking agents. It has been found that such one-pack coatings possess a surprisingly high acid etch resistance as well as good non-yellowing behavior and excellent exterior durability.

These and other features and advantages of the present invention will be more readily understood by one skilled in the art from a reading of the following detailed description.

DETAILED DESCRIPTION OF THE PREFERRED EMBODIMENTS

As just mentioned, the coating compositions in accordance with the present invention comprise, in general, (1) a particular polyurethane polyol and (2) a crosslinking agent for the hydroxyl groups of the polyurethane polyol.

Suitable polyurethane polyols are those possessing an Mn ranging from about 600 to about 3000, preferably of about 2500 or less and greater than about 1000, and a degree of dispersion (Mw/Mn) ranging from about 1.1 to about 3.5, preferably less than about 2.5, and especially less than about 2.0, which comprise the reaction product of:

(A) a diol component selected from substantially monomeric, symmetric 1,3-diols comprising at least 4 carbon atoms, and
(B) an isocyanate component selected from n-functional polyisocyanates, wherein n is a number in the range of from 2 to 5.

The isocyanate component, as just mentioned, is selected from n-functional isocyanates wherein n is a number ranging from 2 to 5, preferably from 2 to 4, and especially from 3 to 4. The isocyanate component may comprise a single such n-functional isocyanate or combinations thereof.

As specific examples of suitable n-functional isocyanates may be mentioned, for example, diisocyanates such as 1,6-hexane diisocyanate (commercially available, for example, under the trade designation HMDI from Mobay Chemical), isophorone diisocyanate (commercially available, for example, under the trade designation IPDI from Huels America Inc.), tetramethylxylene diisocyanate (commercially available, for example, under the trade designation m-TMXDI from American Cyanamid Co.), 2-methyl-1,5-pentane diisocyanate, 2,2,4-trimethyl-1,6-hexane diisocyanate, 1,12-dodecane diisocyanate and methylene bis(4-cyclohexyl isocyanate) (commercially available, for example, under the trade designation Desmodur W from Mobay Chemical); and higher functional isocyanates such as a biuret of 1,6-hexane diisocyanate (commercially available, for example, under the trade designation Desmodur N from Mobay Chemical), an isocyanurate of 1,6-hexane diisocyanate (commercially available, for example, under the trade designation Desmodur N-3300 from Mobay Chemical and Tolonate HDT-LV from Rhone-Poulenc), an isocyanurate of isophorone diisocyanate (commercially available, for example, under the trade designation Desmodur Z-4370 from Mobay Chemical), a reaction product of tetramethylxylene diisocyanate and trimethylol propane (commercially available, for example, under the trade designation Cythane 3160 from American Cyanamid), and a reaction product of one mole of trimethylol propane and 3 moles of toluene diisocyanate (commercially available, for example, under the trade designation Mondur CB from Bayer).

Particularly preferred for use with the present invention are the biurets and/or isocyanurates of monomeric diisocyanates, especially 1,6-hexane diisocyanate. Isocyanurates are typically obtained by the cyclotrimerization of three moles of the diisocyanate, while biurets are typically obtained by the reaction of three moles of the diisocyanate with one mole of water. Also particularly preferred are the reaction products of monomeric diisocyanates with multi-functional alcohols having from 2 to 4 hydroxyl groups, and wherein the ratio of hydroxyl groups to isocyanate groups is from about 0.45 to about 0.55.

As also indicated above, the diol component is selected from substantially monomeric, symmetric 1,3-diols comprising at least 4 carbon atoms. By "symmetric diol" is it meant a diol possessing hydroxyl groups of the same "order"—for 1,3-diols, of course, this means two primary hydroxyl groups. The diol component may comprise a single such monomeric, symmetric 1,3-diol or combinations thereof.

Preferred symmetric 1,3-diols are those comprising at least 4 carbon atoms and, more preferably, at least 5 carbon atoms. As specific preferred examples of such may be mentioned neopentyl glycol, 2-butyl-2-ethyl-1,3-propane diol and 2,2-diethyl-1,3-propane diol.

The polyurethane polyols are produced by reacting the diol component (A) and the isocyanate component (B) in a manner so as to result in the aforementioned desired molecular weight properties. Preferably, this is accomplished by adding the isocyanate component to the diol component at a temperature of about 125° C. or less and, optionally, in the presence of a polyurethane catalyst, in an amount such that the ratio of the number of moles of the diol component to the number of moles of isocyanate equivalents is in the range of from 0.8 to 1.2, preferably from 0.9 to 1.1, more preferably from 0.95 to 1.05, still more preferably from 0.98 to 1.02. Of course, the relative amounts of polyol and isocyanate components will depend upon the functionality of the isocyanate component. Stated another way, for every 1 mole of the n-functional isocyanate, there should be reacted from 0.8n to 1.2n, preferably from 0.9n to 1.1n, more preferably from 0.95n to 1.05n, still more preferably from 0.98n to 1.02n.

The components are preferably reacted at a temperature of about 125° C. or less, more preferably ranging from about 15° C. to about 125° C. The components may also optionally be reacted in the presence of a polyurethane catalyst. Suitable polyurethane catalysts are conventional and may be utilized in conventional amounts. It is preferred to utilize a conventional tin based polyurethane catalyst such as, for example, dibutyltin dilaurate, in amounts ranging from about 0.001% to about 0.5% by weight based upon the total weight of the two components; however, the particular choice of catalyst type and amount will be dictated based upon a number of factors such as the particular components and reaction conditions. These and other factors are well-known to those skilled in the art, who can make the proper choices accordingly.

In an alternative but less convenient process, similar polyurethane polyols may also be produced in a manner such as described in U.S. Pat. No. 4,543,405 (see, for example column 6, line 52 through column 7, line 55), which is hereby incorporated by reference for all purposes. More specifically, the polyurethane polyols are produced by reacting, under generally standard polyurethane reaction conditions, the isocyanate component with a significant stoichiometric excess of the diol component. Upon completion of the reaction, the excess diol component is removed, for example, by distillation. Further details may be had by reference to U.S. Pat. No. 4,543,405.

Of course, it will be recognized by one skilled in the art that the excess of diol need not, in all cases, be removed by distillation as described in U.S. Pat. No. 4,543,405. Depending upon factors including the volatility of the diol, the nature of the crosslinking agent and the curing conditions of the coating, the unreacted diol can function as a solvent or reactive diluent, or can merely be allowed to escape from the film upon curing.

Coating compositions may be formulated from these polyurethane polyols and suitable crosslinking agents. As suitable crosslinking agents may generally be mentioned any one of a number of well-known hydroxyl group-reactive crosslinking agents, such as polyisocyanates, blocked polyisocyanates and/or aminoplast resins.

The use of the above-described polyurethane polyols allows formulation of high solids coatings, possessing a non-volatiles content ranging from about 40 wt % to about 80 wt %, at low solution viscosities ranging from about 25 mPa.s to about 300 mPa.s, preferably ranging from about 50 mPa.s to about 200 mPa.s, at 25° C.

As mentioned above, an especially advantageous use of the polyurethane polyols in accordance with the present invention is as a one-pack coating system formulated with an aminoplast and/or blocked polyisocyanate crosslinking agent.

Generally speaking, the aminoplast crosslinking agents are aldehyde condensation products of melamine, urea, benzoguanamine or similar known compounds. The most commonly used aldehyde is formaldehyde. These condensation products contain methylol or similar alkylol groups, which are commonly etherified with an alcohol having from 1 to 4 carbon atoms, such as methanol or butanol. The aminoplast resin can be substantially monomeric or polymeric depending upon the desired end properties of the coating. For example, monomeric melamine resins are preferred because they allow coatings with higher solids contents, while polymeric melamines are useful in coatings where the use of a strong acid catalyst should be avoided.

As suitable specific examples of aminoplast crosslinkers of the type described above may be mentioned hexamethoxymethyl melamines (commercially available, for example, under the trade designation Cymel 303 from American Cyanamid); mixed ether methoxy/-butoxy methylmelamines (commercially available, for example, under the trade designation Cymel 1135 from American Cyanamid), polymeric butoxy methylmelamines (commercially available, for example, under the trade designation M-281-M from Cook Paint and Varnish) and high imino polymeric methoxymethyl melamines (commercially available, for example, under the trade designation Cymel 325 from American Cyanamid). This list could include various other well-known crosslinkers which differ, for example, by degree of polymerization, imino content, free methylol content and ratios of alcohol used for etherification.

These aminoplast crosslinking agents may be utilized in widely varying weight ratios of polyurethane polyol to aminoplast, generally ranging from about 90:10 to 40:60, preferably from about 90:10 to 50:50.

As suitable isocyanate crosslinking agents may be mentioned any of a number of those known for use in similar systems. As specific examples may be mentioned the previously described n-functional isocyanates, especially the biuret and isocyanurate versions. Blocking of such isocyanates is well-known to those skilled in the art and need not be detailed here. An especially preferred such crosslinking agent is a malonate blocked isocyanate (commercially available under the trade designation Desmodur XP-7012 from Mobay).

As with the aminoplast crosslinking agents, the isocyanate crosslinking agents may also be utilized in widely varying amounts, but generally in an equivalents ratio of hydroxyl to isocyanate (including blocked isocyanate) groups ranging from about 0.4 to about 2.2.

The coating compositions may also contain a catalyst for the curing reaction, such as well-known acid catalysts and blocked derivatives thereof. Generally, these catalysts are utilized in amounts ranging from about 0.1% to about 5% by weight based upon the weight of the non-volatiles in the coating.

As specific examples of suitable acid catalysts may be mentioned phosphoric acid; alkyl acid phosphates such as phenyl acid phosphate; sulfonic acid and substituted sulfonic acids, such as p-toluene sulfonic acid (commercially available, for example, under the trade designation Cycat 4040 from American Cyanamid), amine blocked p-toluene sulfonic acid (commercially available, for example, under the trade designation VP-451 from Byk-Mallinckrodt), dodecylbenzene sulfonic acid (commercially available, for example, under the trade designation Bio-Soft S-100 from Stephan), amine blocked dodecylbenzene sulfonic acid (commercially available, for example, under the trade designations Nacure 5226 and Nacure XP-158 from King Industries) and dinonylnaphthalene disulfonic acid; and maleic acid and alkyl acid maleates.

Depending upon the field of application, the coating compositions may also contain a variety of other additives common to the paint industry such as co-binders (e.g., other hydroxyl functional resins such as acrylic polyols and other polyurethane and urethane-modified polyols), solvents, pigments, coloring agents, pigment dispersing agents, light stabilizers, UV light absorbers and thixotropic and other rheological agents.

With respect to the use of co-binders, in accordance with the present invention it has also been found that the polyurethane polyols are effective in significantly improving the acid etch resistance of coating compositions comprising other polyols as the primary binder.

For pigmented systems, the coating compositions will normally be formulated to contain additives for flow, surface tension adjustment, pigment wetting and/or solvent popping. As examples of typical additives may be mentioned flow aids (commercially available, for example, under the trade designation Coroc A-620-A2 polybutylacrylate from Cook Paint and Varnish, and BYK-320 silicone from BYK-Mallinckrodt); pigment wetting aids (commercially available, for example, under the trade designation Disperbyk from BYK-Mallinckrodt); UV absorbers (commercially available, for example, under the trade designation Tinuvin 900 from Ciba-Geigy); and amine light stabilizers (commercially available, for example, under the trade designation Tinuvin 292 from Ciba-Geigy).

These coating compositions may be applied onto any number of well-known substrates by any one of a number of conventional application methods. Curing of the coatings may be conducted under a variety of conditions, although curing of the above-described one-pack systems is preferably carried out under baking conditions typically from about 80° C. to about 200° C.

The foregoing more general discussion of the present invention will be further illustrated by the following specific examples.

EXAMPLES (I) Synthesis of the Polyurethane Polyols

Polyurethane Polyol A

Into a 4 neck round bottom flask equipped with a stirrer, condenser, immersion thermometer, constant pressure addition funnel and nitrogen inlet were charged the following:
365.0 g of 2-butyl-2-ethyl-1,3-propane diol (2.28 moles),
125.25 g of methyl amyl ketone and
0.7 g of a 10% solution of dibutyltin dilaurate (commercially available under the trade designation Fascat 4202 from Atochem) in butyl acetate, and the mixture heated to 70° C. under a nitrogen blanket.

When the temperature had reached 70° C., the following were added through the addition funnel over the course of two hours:
414.0 g of the isocyanurate of hexamethylene diisocyanate (equivalent weight 181) (commercially available under the trade designation Tolonate HDT-LV from Rhone-Poulenc) (2.28 equivalents) and
125.25 g of methyl amyl ketone.

During addition of this mixture, the flask was cooled with an air stream as necessary to maintain the temperature. After heating for an addition 90 minutes, it was determined (by Fourier Transform Infared Spectroscopy—FTIR) that no residual isocyanate remained.

The resulting solution of polyurethane polyol A was a water white resin solution having a non-volatile content of 75.6% and a viscosity (Brookfield viscometer, #4 spindle, 10 rpm, 25° C.) of 5500 mPa.s. The theoretical OH equivalent weight of the resin was 342 (OH equivalent weight is based on solids).

The molecular weights of the polymer were measured using a Waters Associates (Milford, Mass.) Model 840 Gel Permeation Chromatograph (GPC). The GPC was equipped with three 7.8 mm ID X 30 cm ultrastyragel columns with linear, 100 and 500 angstrom pore sizes. A differential refractometer was used as a detector, and all samples were run using tetrahydrofuran (THF) as eluent with a flow rate of 1.0 ml min.

To determine the molecular weights, a calibration curve was constructed using a combination of polystyrene (PS) standard (covering a high molecular weight range) and polyethylene glycol (PEG) standards (covering a low molecular weight range) obtained commercially from American Polymer Standards Corp. (Mentor, Ohio). The peak molecular weights (Mp) of the PS standards were 2070, 4000, 5450, 8500, 9300, 14,000, 20,600, 30,800, 49,000, 110,000, 240,000, and 390,000. The peak molecular weights of the PEG standards were 62, 106, 238, 330, 425, 610, 1050 and 1500.

To obtain the calibration curve, standard solutions were prepared from 0.1 g of a standard diluted to a total volume of 25 ml with THF. A calibration standard could contain up to four individual standards so long as each standard differed in Mp from all other standard in the solution by about a 10-fold factor or more. The calibration standards were filtered through a 45 micron filter (commercially obtained from Phenomenex Inc., Torrence, Calif.), then 100 microliters of the solution was injected onto the columns and a chromatogram obtained. A calibration curve of elution time vs. log molecular weight using a narrow standard calibration and third order fit was obtained with the Waters Model 840 software, version 6.2.

The samples to be analyzed were prepared by placing 0.1 g of the sample in a 25 ml volumetric flask and diluting with THF. After filtration through the 45 micron filter, 100 microliters was injected onto the columns and a chromatogram obtained. The Mw, Mn and Mw/Mn were obtained relative to the above-described calibration curve using the Waters Model 840 software.

The polyurethane polyol A had an Mn of 1732, Mw of 2452 and degree of dispersion of 1.41.

Polyurethane Polyol B

The procedure of producing polyurethane polyol A was repeated in its entirety except that (i) 297.45 g of 2,2-diethyl-1,3-propane diol (2.25 moles) was substituted for the 2-butyl-2-ethyl-1,3-propane diol and (ii) the amount of crosslinker was reduced to 407.3 g (2.25 equivalents).

The resulting solution of polyurethane polyol B was a water white resin solution having a non-volatile content of 73.6% and a viscosity of 1650 mPa.s. The theoretical OH equivalent weight of the resin was 313.

The polyurethane polyol B had an Mn of 1387, Mw of 1866 and degree of dispersion of 1.35.

Polyurethane Polyol C

The procedure of producing polyurethane polyol A was repeated in its entirety except that (i) 476.4 g of 2,2-dimethyl-1,3-propane diol (neopentyl glycol) (4.57 moles) was substituted for the 2-ethyl-2-butyl-1,3-propane diol, (ii) 250.5 g of methyl amyl ketone was used, (iii) 1.4 g of dibutyltin dilaurate solution was used and (iv) 828 g of crosslinker (4.52 equivalents) diluted in 250 g of methyl amyl ketone was used.

The resulting solution of polyurethane polyol C was a water white resin solution having a non-volatile content of 76.4% and a viscosity of 4840 mPa.s. The theoretical OH equivalent weight of the resin was 285.

The polyurethane polyol C had an Mn of 1505, Mw of 2169 and degree of dispersion of 1.44.

Polyurethane Polyol D (Comparative)

The procedure of producing polyurethane polyol A was repeated in its entirety except that 142.0 g of ethylene glycol (2.29 moles) was substituted for the 2-butyl-2-ethyl-1,3-propane diol.

The resulting solution of polyurethane polyol D was a two-phase system, the majority of which has a white, opaque color. The two-phase nature of the system made it impossible to accurately measure solids content and viscosity. The theoretical OH equivalent weight of the resin was 243.

The polyurethane polyol D had an Mn of 1598, Mw of 3145 and degree of dispersion of 1.97.

Polyurethane Polyol E (Comparative)

The procedure of producing polyurethane polyol A was repeated in its entirety except that 206.01 g of 1,4-butane diol (2.28 moles) was substituted for the 2-ethyl-2-butyl-1,3-propane diol.

The resulting solution of polyurethane polyol E was a two-phase system, the majority of which had a white, opaque color. The two-phase nature of the system made it impossible to accurately measure solids content and viscosity. The theoretical OH equivalent weight of the resin was 271.

The polyurethane polyol E had an Mn of 3446, Mw of 25904 and degree of dispersion of 7.51.

Polyurethane Polyol F (Comparative)

The procedure of producing polyurethane polyol A was repeated in its entirety except that 206.28 g of 2,3-butane diol (2.28 moles) was substituted or the 2-butyl-2-ethyl-1,3-propane diol.

The resulting solution of polyurethane polyol F was a water white resin solution having a non-volatile content of 72.6% and a viscosity of 6872 mPa.s. The theoretical OH equivalent weight of the resin was 271.

The polyurethane polyol F had an Mn of 1213, Mw of 1508 and degree of dispersion of 1.24.

Polyurethane Polyol G (Comparative)

The procedure of producing polyurethane polyol A was repeated in its entirety except that (i) 265.9 g of 2-methyl-2,4-pentane diol (2.25 moles) was substituted for the 2-butyl-2-ethyl-1,3-propane diol and (ii) 407.3 g (2.25 equivalents) of the crosslinker was used.

The resulting solution of polyurethane polyol G was a water white resin solution having a non-volatile content of 73.7%. The theoretical OH equivalent weight of the resin was 299.

The polyurethane polyol G had an Mn of 1490, Mw of 2158 and degree of dispersion of 1.45.

Polyurethane Polyol H (Comparative)

The procedure of producing polyurethane polyol A was repeated in its entirety except that (i) 49.12 g of 1,2-cyclohexane diol (a mixture of isomers commercially obtained from Aldrich Chemical) (0.423 moles) was substituted for the 2-butyl-2-ethyl-1,3-propane diol, (ii) 47.05 g of methyl amyl ketone was used, (iii) 0.13 g of dibutyltin dilaurate solution was used and (iv) 76.6 g (0.423 equivalents) of undiluted crosslinker was used.

The resulting solution of polyurethane polyol H was a water white resin solution having a non-volatile content of 71.2%. The theoretical OH equivalent weight of the resin was 297.

The polyurethane polyol H had an Mn of 1250, Mw of 1834 and degree of dispersion of 1.47.

(II) Formulation of Clear Coatings

Examples 1–3 and Comparative Examples 1–6

Clear coatings were formulated from the polyurethane polyol solutions by mixing the following components in accordance with normal paint formulation techniques:

60 parts by weight (based on non-volatiles) of the polyurethane polyol solution, 40 parts by weight of a hexamethoxymethyl melamine ("HMMM") (commercially available under the trade designation Cymel 303 from American Cyanamid), 1.0 wt % of an amine blocked dodecylbenzene sulfonic acid catalyst (commercially available under the trade designation Nacure 5226 from King Industries) and 0.1 wt % of a polybutylacrylate flow agent (commercially available under the trade designation Coroc A-620-A2 from Cook Paint and Varnish).

Wt % is based upon the combined weight of the polyurethane polyol solution and HMMM. Polyol slutions D through H were employed for Comparative Examples 1 to 5.

For comparative example 6 (CE6), the polyurethane polyol was replaced with a "standard" acrylic polyol having an Mn of about 3800 and a degree of dispersion of about 2.5, which was produced from the following monomer mixture:

30.2 wt % hydroxyethyl methacrylate,
36.1 wt % butyl methacrylate,
13.3 wt % styrene and
20.4 wt % butyl acrylate.

All samples were reduced to about 60% non-volatiles by addition of tetrahydrofuran, then drawn down with a #55 roll bar on cold rolled steel panels electrocoated according to Ford specification M64J26 and Taupe primed to Ford specification M6J152B (commercially available from Advanced Coatings Technologies Inc., Hillsdale, Mich.).

The coated panels were then baked in a Dispatch forced oven for 30 minutes at 250° C. The resulting dry film thickness was between about 1.5-1.8 mils (about 38-46 m).

The so-produced coatings were tested for acid etch resistance by application of a simulated acid rain solution formulated by mixing 1 normal aqueous solutions of sulfuric, nitric and hydrochloric acids at a volume ratio of 65/30/5.

Each panel was marked with a grid containing 12 rectangles (test spots). The first test spot was spotted with 3 drops (approx. 0.5 ml) of the above simulated acid rain solution and left standing uncovered at room temperature. A new test spot was spotted each hour, at which time the evaporated acid rain solution was replenished so that the spot size remained about the same throughout testing. At the end of the exposure time, the panel was rinsed with distilled water and allowed to dry overnight. The panels were inspected for damage the following day. The exposure times required to damage the various coatings are reported below in Table I. Film degradation was characterized by cracking and other catastrophic failure. A 12+ means that the film did not fail within the 12 hour testing period.

TABLE I

| Example | PUPO Solution | Hours to Film Degradation |
|---|---|---|
| 1 | A | 12+ |
| 2 | B | 12+ |
| 3 | C | 11 |
| CE1 | D | 7 |
| CE2 | E | 7 |
| CE3 | F | 4 |
| CE4 | G | 7 |
| CE5 | H | 7 |
| CE6 | — | 4 |

These results demonstrate that the acid etch resistance of films produced from the coating compositions in accordance with the present invention are significantly improved over other very similar systems (CE1-CE5), the difference being the diol component of the polyurethane polyol.

These results also suggest that a significant improvement in acid etch resistance was obtained by replacement of a standard acrylic polyol with a polyurethane polyols in accordance with the present invention.

Further, the melamine crosslinked coatings based upon the polyurethane polyols in accordance with the present invention displayed acid etch resistance approaching that of a two-component acrylic urethane system known for its acid resistance.

Only a limited number of preferred embodiments of the present invention have been described above. One skilled in the art, however, will recognize numerous substitutions, modifications and alterations which can be made without departing from the spirit and scope of the invention as limited by the following claims.

We claim:

1. A coating composition comprising:
    (1) a polyurethane polyol possessing a number average molecular weight in the range of from about 600 to about 3000 and a degree of dispersion in the range of from about 1.1 to about 3.5, comprising the reaction product of
        (A) a diol component selected from substantially monomeric, symmetric 1,3-diols comprising at least 4 carbon atoms, and
        (B) an isocyanate component selected from n-functional polyisocyanates, wherein n is a number in the range of from 2 to 5; and
    (2) an hydroxyl group-reactive crosslinking agent.

2. The coating composition of claim 1, possessing a non-volatiles content ranging from about 40 wt % to about 80 wt % at a solution viscosity ranging from about 25 mPa.s to about 300 mPa.s at 25° C.

3. The coating composition of claim 2, possessing a non-volatiles content ranging from about 40 wt % to about 80 wt % at a solution viscosity ranging from about 50 mPa.s to about 200 mPa.s at 25° C.

4. The coating composition of claim 1, wherein the polyurethane polyol comprises the reaction product of (A) from 0.8n to 1.2n moles of the diol component and (B) 1 mole of the isocyanate component.

5. The coating composition of claim 4, wherein the polyurethane polyol comprises the reaction product of (A) from 0.9n to 1.1n moles of the polyol component, and (B) 1 mole of the isocyanate component.

6. The coating composition of claim 5, wherein the polyurethane polyol comprises the reaction product of (A) from 0.98n to 1.02n moles of the polyol component, and (B) 1 mole of the isocyanate component.

7. The coating composition of claim 1, wherein n is a number in the range of from 2 to 4.

8. The coating composition of claim 7, wherein n is a number in the range of from 3 to 4.

9. The coating composition of claim 8, wherein the polyisocyanate component of the polyurethane polyol is selected from an isocyanurate of a monomeric diisocyanate, a biuret of a monomeric diisocyanate, and the reaction product of a monomeric diisocyanate with a multi-functional alcohol having 2 to 4 hydroxyl groups in a ratio of hydroxyl to isocyanate groups of from about 0.45 to 0.55.

10. The coating composition of claim 1, wherein the diol component of the polyurethane polyol is selected from substantially monomeric symmetric 1,3-diols comprising at least 5 carbon atoms.

11. The coating composition of claim 10, wherein the diol component of the polyurethane polyol is selected from neopentyl glycol, 2-butyl-2-ethyl-1,3-propane diol and 2,2-diethyl-1,3-propane diol.

12. The coating composition of claim 1, wherein the polyurethane polyol possesses a number average molecular weight of about 2500 or less.

13. The coating composition of claim 1, wherein the polyurethane polyol possesses a number average molecular weight greater than about 1000.

14. The coating composition of claim 1, wherein the polyurethane polyol possesses a degree of dispersion of about 2.5 or less.

15. The coating composition of claim 14, wherein the polyurethane polyol possesses a degree of dispersion of about 2.0 or less.

16. The coating composition of claim 1, wherein the hydroxyl group-reactive crosslinking agent is selected from a polyisocyanate, blocked polyisocyanate and an aminoplast resin.

17. The coating composition of to claim 16, wherein the hydroxyl group-reactive crosslinking agent comprises an aminoplast resin.

18. The coating composition of claim 17, wherein the hydroxyl group-reactive crosslinking agent comprises an aminoplast resin in a weight ratio of polyurethane polyol to aminoplast resin in the range of from about 90:10 to 50:50.

19. The coating composition of claim 18, wherein the aminoplast resin comprises an hexamethoxy melamine etherified with an alcohol having from 1 to 4 carbon atoms.

20. The coating composition of claim 17, formulated as a one-pack system.

21. The coating composition of claim 20, possessing a non-volatiles content ranging from about 40 wt % to about 80 wt % at a solution viscosity ranging from about 25 mPa.s to about 300 mPa.s at 25° C.

22. The coating composition of claim 21, possessing a non-volatiles content ranging from about 40 wt % to about 80 wt % at a solution viscosity ranging from about 50 mPa.s to about 200 mPa.s at 25° C.

23. The coating composition of to claim 16, wherein the hydroxyl group-reactive crosslinking agent comprises a blocked polyisocyanate.

24. The coating composition of claim 23, wherein the hydroxyl group-reactive crosslinking agent comprises a blocked polyisocyanate in an equivalent ratio of hydroxyl to isocyanate groups ranging from about 0.4 to 2.2.

25. The coating composition of claim 24, wherein the polyisocyanate is malonate blocked.

26. The coating composition of claim 23, formulated as a one-pack system.

27. The coating composition of claim 26, possessing a non-volatiles content ranging from about 40 wt % to about 80 wt % at a solution viscosity ranging from about 25 mPa.s to about 300 mPa.s at 25° C.

28. The coating composition of claim 27, possessing a non-volatiles content ranging from about 40 wt % to about 80 wt % at a solution viscosity ranging from about 50 mPa.s to about 200 mPa.s at 25° C.

29. A coating composition comprising:
  (1) a polyurethane polyol possessing a number average molecular weight in the range of from greater than about 1000 to about 3000 and a degreee of dispersion in the range of from about 1.1 to about 3.5, comprising the reaction product of
    (A) from 0.8n to 1.2n moles of a diol component selected from substantially mononeric, symmetric 1,3-diols comprising at least 4 carbon atoms, and
    (B) one mole of an isocyanate component selected from n-functional polyisocyanates, wherein n is a number in the range of from 3 to 4; and
  (2) an hydroxyl group-reactive crosslinking agent.

* * * * *